US010397159B2

United States Patent
Cohen

(10) Patent No.: US 10,397,159 B2
(45) Date of Patent: Aug. 27, 2019

(54) SYSTEMS, APPARATUSES, AND METHODS FOR PRESENTING CONTACTS BY PROJECT

(71) Applicant: Fred J. Cohen, Great Neck, NY (US)

(72) Inventor: Fred J. Cohen, Great Neck, NY (US)

( * ) Notice: Subject to any disclaimer, the term of this patent is extended or adjusted under 35 U.S.C. 154(b) by 326 days.

(21) Appl. No.: 14/797,909

(22) Filed: Jul. 13, 2015

(65) Prior Publication Data

US 2016/0014067 A1    Jan. 14, 2016

Related U.S. Application Data

(60) Provisional application No. 62/023,410, filed on Jul. 11, 2014.

(51) Int. Cl.
*G06Q 10/10* (2012.01)
*H04L 12/58* (2006.01)
*G06F 16/9535* (2019.01)

(52) U.S. Cl.
CPC .......... *H04L 51/22* (2013.01); *G06F 16/9535* (2019.01); *G06Q 10/10* (2013.01)

(58) Field of Classification Search
CPC ...... G06Q 10/06; G06Q 10/107; G06Q 40/02; H04L 22/16
See application file for complete search history.

(56) References Cited

U.S. PATENT DOCUMENTS

| | | | |
|---|---|---|---|
| 6,201,814 B1 * | 3/2001 | Greenspan | H04L 51/28 370/428 |
| 7,219,302 B1 | 5/2007 | O'Shaughnessy et al. | |
| 7,386,535 B1 | 6/2008 | Kalucha et al. | |
| 7,774,408 B2 | 8/2010 | Sinha et al. | |
| 7,930,430 B2 | 4/2011 | Thatcher et al. | |
| 8,488,764 B1 * | 7/2013 | Swartz | H04M 3/565 370/261 |
| 8,566,319 B2 * | 10/2013 | Abrams | G06Q 10/107 707/737 |
| 9,098,834 B2 | 8/2015 | Ramanathaiah et al. | |
| 2003/0088536 A1 * | 5/2003 | Behnia | G06Q 40/02 |
| 2005/0086096 A1 * | 4/2005 | Bryant | G06Q 10/0635 705/315 |
| 2005/0108293 A1 | 5/2005 | Lipman et al. | |
| 2006/0168543 A1 * | 7/2006 | Zaner-Godsey | G06Q 10/107 715/835 |
| 2007/0005374 A1 * | 1/2007 | Harkin | G06Q 10/06 705/310 |

(Continued)

*Primary Examiner* — Li P Sun
*Assistant Examiner* — Qi Wan
(74) *Attorney, Agent, or Firm* — Carter, Deluca & Farrell LLP

(57) ABSTRACT

A method for addressing message recipients is disclosed, including enabling a user to select a project, displaying recipients related to the selected project, wherein each recipient has at least one address, and enabling the user to select individual recipients to add their addresses to a recipients field of the message. The method may further include selecting a group related to the message, wherein the group includes at least one member arranged in an order based on their respective roles within the selected group and wherein the members have at least one address, displaying the at least one of members according to the arrangement, and enabling a user to select a member of the group to add the member's address to the recipients field of the message.

15 Claims, 7 Drawing Sheets

(56) References Cited

U.S. PATENT DOCUMENTS

| | | | | |
|---|---|---|---|---|
| 2007/0143424 A1* | 6/2007 | Schirmer | ............... | H04L 12/66 |
| | | | | 709/206 |
| 2007/0168863 A1* | 7/2007 | Blattner | ................ | H04L 51/04 |
| | | | | 715/706 |
| 2008/0091785 A1* | 4/2008 | Pulfer | ................. | G06Q 10/107 |
| | | | | 709/206 |
| 2008/0155471 A1* | 6/2008 | Lynn | ................ | H04M 1/72547 |
| | | | | 715/811 |
| 2011/0010423 A1* | 1/2011 | Thatcher | ............ | G06Q 10/107 |
| | | | | 709/206 |
| 2012/0143921 A1* | 6/2012 | Wilson | ................. | G06Q 50/01 |
| | | | | 707/798 |
| 2013/0290435 A1* | 10/2013 | Martin | ................... | H04L 51/28 |
| | | | | 709/206 |
| 2014/0082521 A1 | 3/2014 | Carolan et al. | | |
| 2015/0227611 A1* | 8/2015 | Bao | ................. | G06F 17/30705 |
| | | | | 707/737 |

* cited by examiner

SYSTEMS, APPARATUSES, AND METHODS FOR PRESENTING CONTACTS BY PROJECT

BACKGROUND

Technical Field

The present disclosure relates to messaging systems in which a message drafting interface is presented with contacts and, more particularly, to messaging systems in which contacts are presented based on a related project. A user may select one or more of the contacts in the message drafting interface to add them as recipients of a message.

Background of Related Art

Generally, in messaging systems, such as email client applications, contacts are shown as a single group. The contacts may be arranged alphabetically, based on frequency of interaction, and/or some other metric known in the art.

SUMMARY

Provided in accordance with the present disclosure is a method for addressing message recipients.

In an aspect of the present disclosure, the method includes enabling a user to select a project, displaying recipients related to the selected project, wherein each recipient has at least one address, and enabling the user to select individual recipients to add their addresses to a recipients field of the message.

In another aspect of the present disclosure, the method further includes selecting a group related to the message, wherein the group includes at least one member arranged based on their respective roles within the selected group and wherein the members have at least one address, displaying at least one of members according to the arrangement, and enabling a user to select a member of the group to add the member's address to the recipients field of the message.

In a further aspect of the present disclosure, the method further includes displaying a role identifier associated with each recipient.

In yet a further aspect of the present disclosure, the displayed recipients are arranged according to their respective roles in the project.

In a further aspect of the present disclosure, the displayed recipients are arranged according to a level of involvement in the project.

In yet a further aspect of the present disclosure, displaying recipients related to the selected project includes displaying members of a first group which are closely related to the selected project and members of a second group which are marginally related to the selected project, wherein members of the first and second groups are based on parameters related to a level of the members' involvement with the project.

In a further aspect of the present disclosure, displaying recipients related to the selected project includes displaying members of a first group which are related to the selected project and members of a second group which are unrelated to the selected project.

In yet a further aspect of the present disclosure, the first group is displayed in a separate area from the second group.

In a further aspect of the present disclosure, the method further includes displaying the addresses associated with each recipient.

In yet a further aspect of the present disclosure, the project may be one of a task, matter, case, subscription list, group, lead, opportunity, or parent entity.

Any of the above aspects and embodiments of the present disclosure may be combined without departing from the scope of the present disclosure.

BRIEF DESCRIPTION OF THE DRAWINGS

The present disclosure may be understood by reference to the accompanying drawings, when considered in conjunction with the subsequent, detailed description, in which.

DETAILED DESCRIPTION

A messaging system according to the present disclosure enables a user to select contacts to add as recipients to a message, which may include, for example, a text message, an instant message, or an email message. In a messaging application, a message drafting interface may be presented to the user. The message drafting interface may include, for example, a field for selecting a project to which the message is related, a field for entering recipients to whom the message will be sent, a field for a subject of the message, and a field for the body of the message. When a project to which the message is related is selected, the message drafting interface may present to the user a list of contacts that are related to the project from which the user may select one or more contacts to be added to the recipients field. Selecting a project may also automatically populate the subject field with a predetermined string of characters related to the project, such as, for example, the project name or number.

Detailed embodiments of devices configured to present the message drafting interface, systems incorporating these devices, and methods using these devices as described below. However, these detailed embodiments are merely examples of the disclosure, which may be embodied in various forms. Therefore, specific structural and functional details disclosed herein are not to be interpreted as limiting, but merely as a basis for the claims and as a representative basis for allowing one skilled in the art to variously employ the present disclosure in virtually any appropriately detailed structure.

Figure 1:
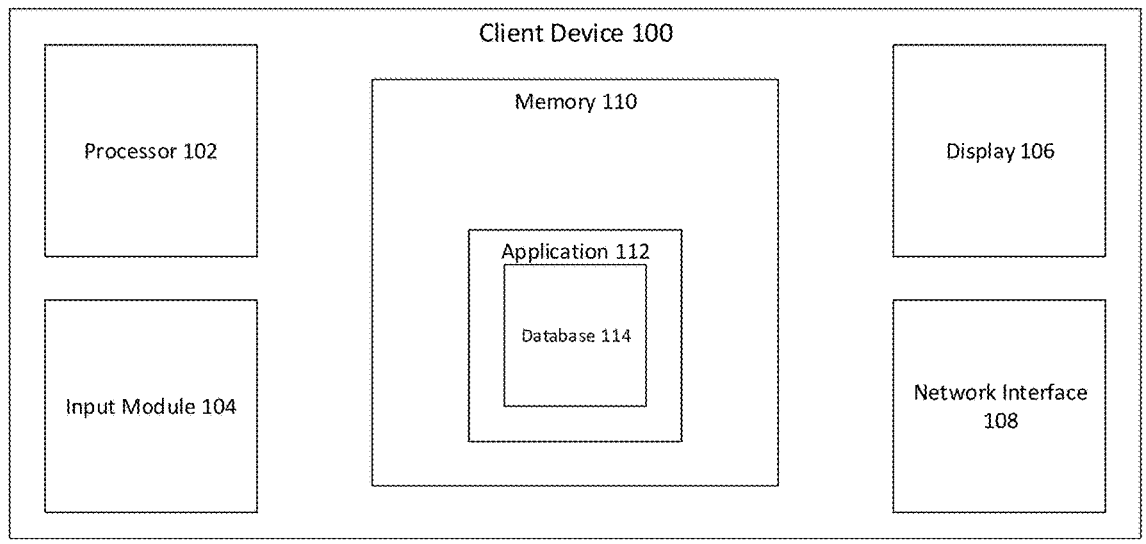
FIG. 1 is a schematic diagram of a client device in accordance with an embodiment of the present disclosure.

With reference to the drawings, FIG. 1 shows a schematic diagram of a client device 100 which may be used by the user in accordance with the present disclosure. The client device 100 may be any one or more of a personal computer, desktop computer, laptop computer, tablet computer, smartphone, smartwatch, or any other type of computer known to those skilled in the art. Client device 100 may include a processor 102, an input module 104, a display 106, a network interface 108, and a memory 110 for storing an application 112. The processor 102 is configured to access the memory 110 in order to run the application 112. Application 112 may include a database 114. Input module 104 may be one or more of a keyboard, mouse, touchscreen, voice-command receiver, gesture receiver, and/or any other user input device known to those skilled in the art. Network interface 108 may be one or more of a local area network (LAN) device, wide area network (WAN) device, a BLUETOOTH® device, a near-field communication (NFC) device, a cellular networking device using the global system for mobile communications (GSM), code division multiple access (CDMA), and/or other cellular networking standards, and/or any other networking devices known to those skilled in the art, and may be configured for wired and/or wireless communication.

In an embodiment, memory 110 may include one or more solid-state storage devices such as flash memory chips. Alternatively or in addition to the one or more solid-state storage devices, memory 110 may include one or more mass storage devices connected to the processor 102 through a mass storage controller (not shown) and a communications bus (not shown). Although the description of computer-readable media contained herein refers to a solid-state storage, it should be appreciated by those skilled in the art that computer-readable storage media may be any available media that can be accessed by the processor 102. That is, computer readable storage media may include non-transitory, volatile and non-volatile, removable and non-removable media implemented in any method or technology for storage of information such as computer-readable instructions, data structures, program modules or other data. For example, computer-readable storage media includes RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information and which can be accessed by client device 100.

Application 112 may be a native application running on client device 100, and/or a web browser configured to open a web-based application hosted by a server, for example, application server 300, which is described below. Database 114 may store data related to projects, contacts, and/or messages. For example, database 114 may store a list of projects which the user's organization is involved in, and a list of contacts known to the user and/or the organization. The projects may be any one or more of a task, matter, case, subscription list, group, lead, opportunity, parent entity, and/or any other type of project known to those skilled in the art. The message may be any one or more of an electronic mail ("email") message, an instant message ("IM"), a text message such as, for example, Short Message Service (SMS) or Multimedia Messaging Service (MMS), and/or any other message using one or more of these or other messaging services or protocols known to those skilled in the art. The contacts may include a name and address of the contact, as well as data indicating which projects they are involved in, and a role which each respective contact has in each project in which that contact is involved.

Figure 2:
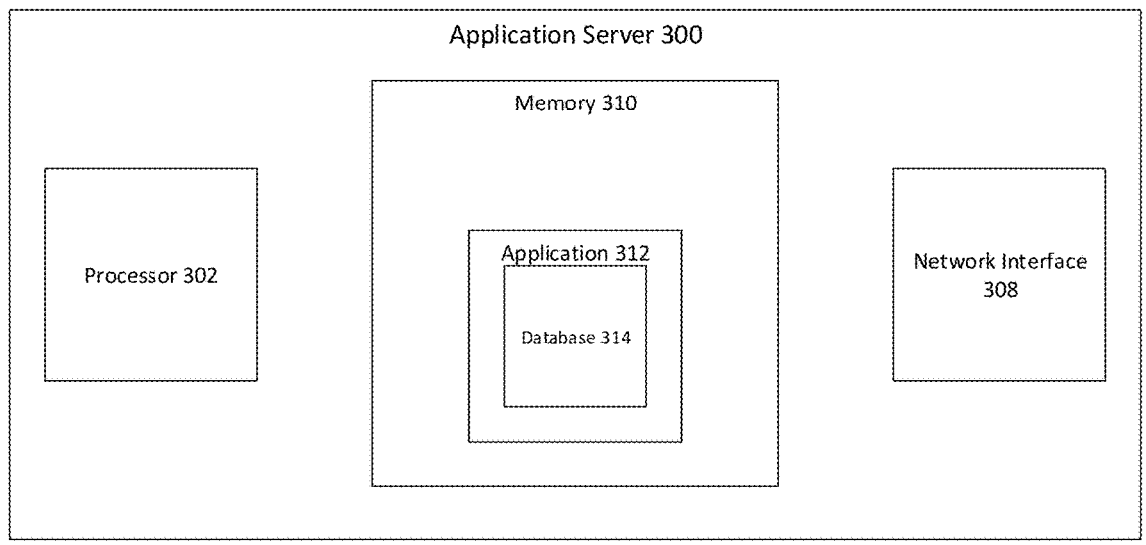
FIG. 2 is a schematic diagram of an application server in accordance with an embodiment of the present disclosure.

With reference to FIG. 2, there is shown a schematic diagram of application server 300 in accordance with the present disclosure. Application server 300 may be a single on-location server configured to operate on an organization's internal network, a single remote server dedicated to a particular organization, a single remote server serving multiple organizations, a series of servers operating in any of these configurations, a cloud-based server, or any other configuration or combination of these and other configurations known to those skilled in the art. Application server 300 may include a processor 302, a network interface 308, and a memory 310 storing an application 312. Application 312 may include a database 314. Network interface 308 and memory 310 may be similar to network interface 108 and memory 110, respectively, described above. Application 312 may be a web-based application hosted by application server 300, which can be accessed by client device 100 via a web-browser application.

Figure 3:
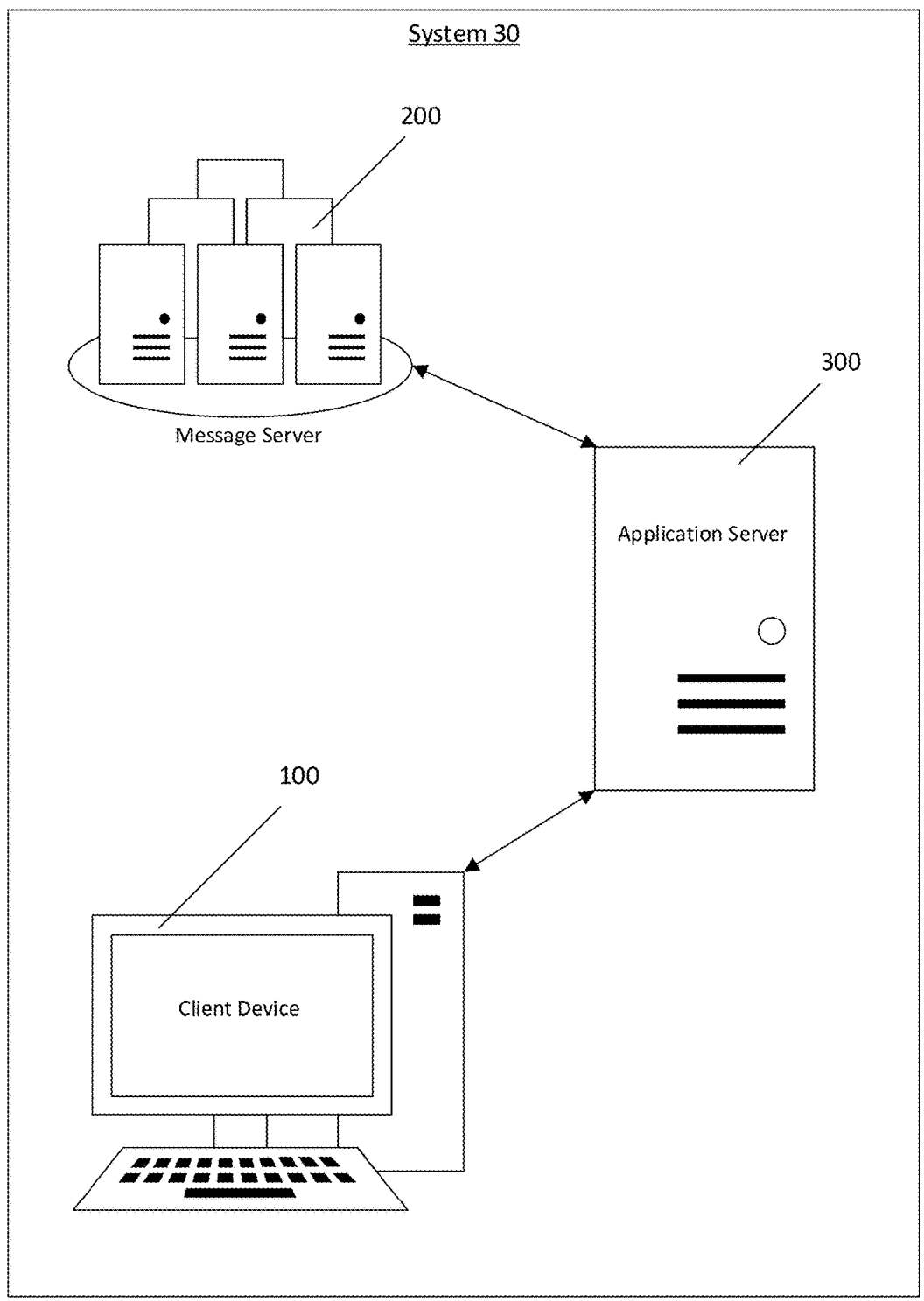
FIG. 3 is a diagram of a system including the client device of FIG. 1 and the application server of FIG. 2 in accordance with an embodiment of the present disclosure.

Turning now to FIG. 3, there is shown a diagram of an example system according to an embodiment of the present disclosure. As illustrated in FIG. 3, system 30 includes client device 100, application server 300, and a message server 200. In this example embodiment, application server 300 hosts a web-based application 312, which is accessed by client device 100 via a web-browser running on client device 100. Application server 300 receives message data stored by message server 200 and arranges the message data in application 312 to be presented to the user of client device 100.

Figure 4:
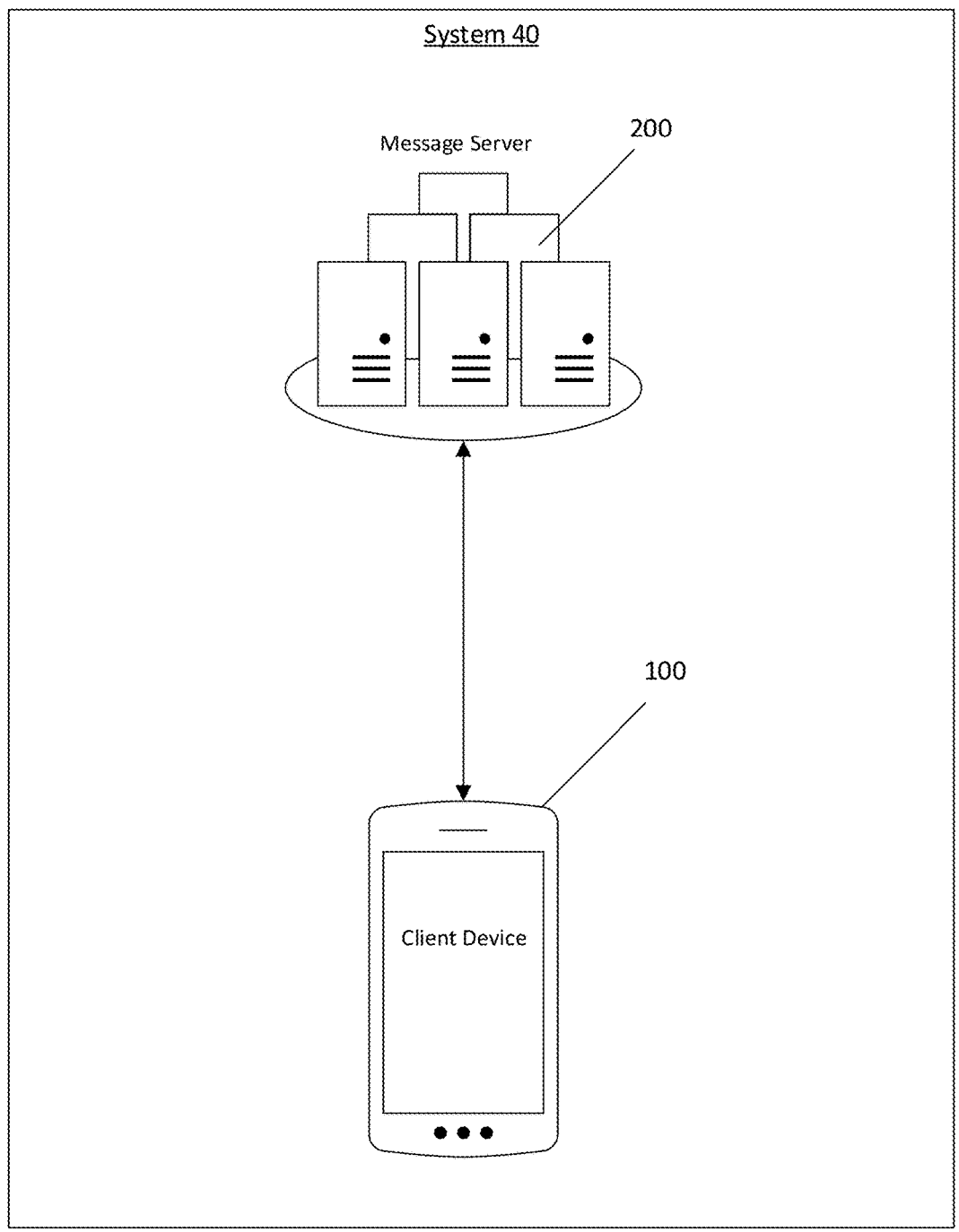
FIG. 4 is a diagram of a system including the client device of FIG. 1 and the application server of FIG. 2 in accordance with another embodiment of the present disclosure.

Referring now to FIG. 4, there is shown a diagram of an example system according to another embodiment of the present disclosure. As illustrated in FIG. 4, system 40 includes client device 100 and message server 200. In this example embodiment, client device 100 includes a native application 112 which receives message data directly from message server 200 and arranges the message data in application 112 to be presented to the user of client device 100, without an application server 300 being involved.

Figure 5:
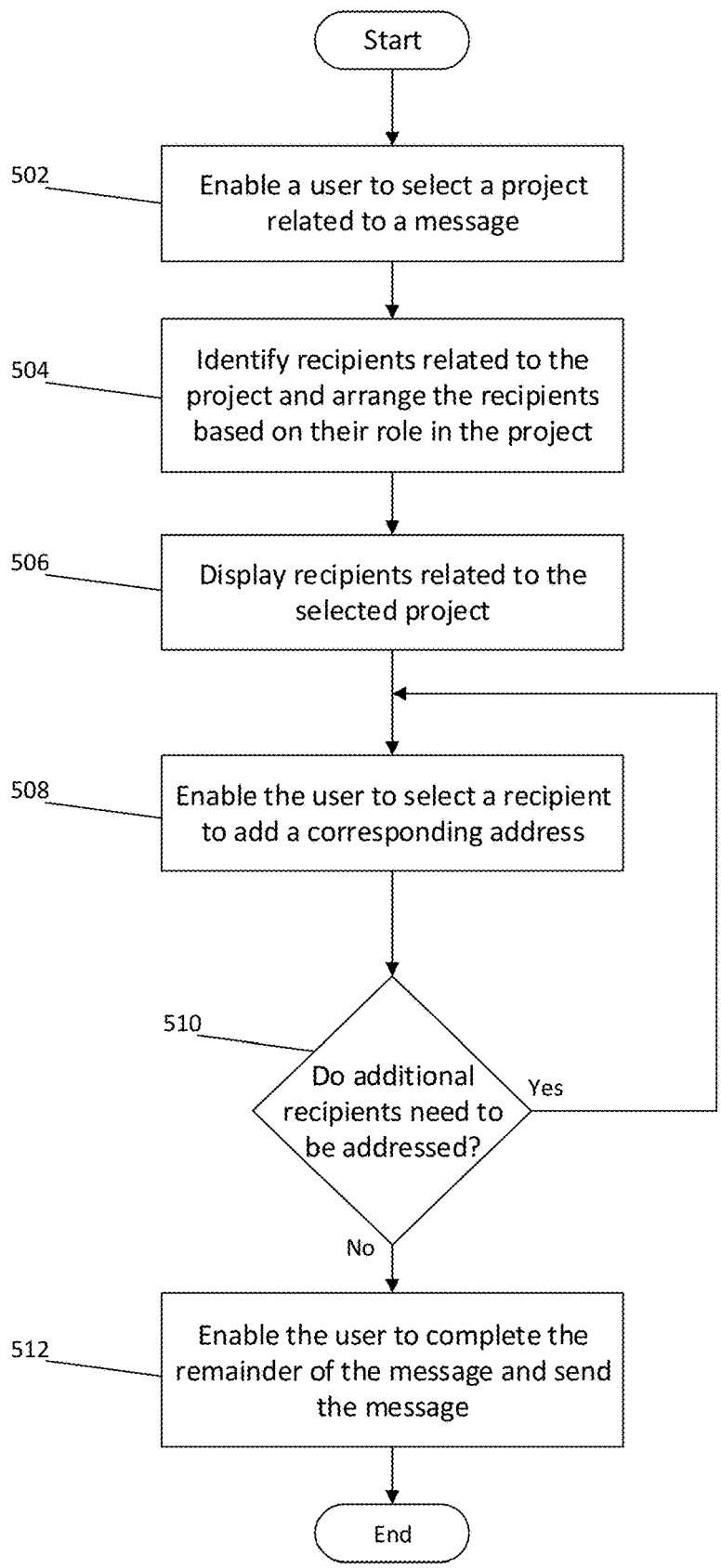
FIG. 5 is a flowchart illustrating an example method in accordance with an embodiment of the present disclosure.
Figure 7:
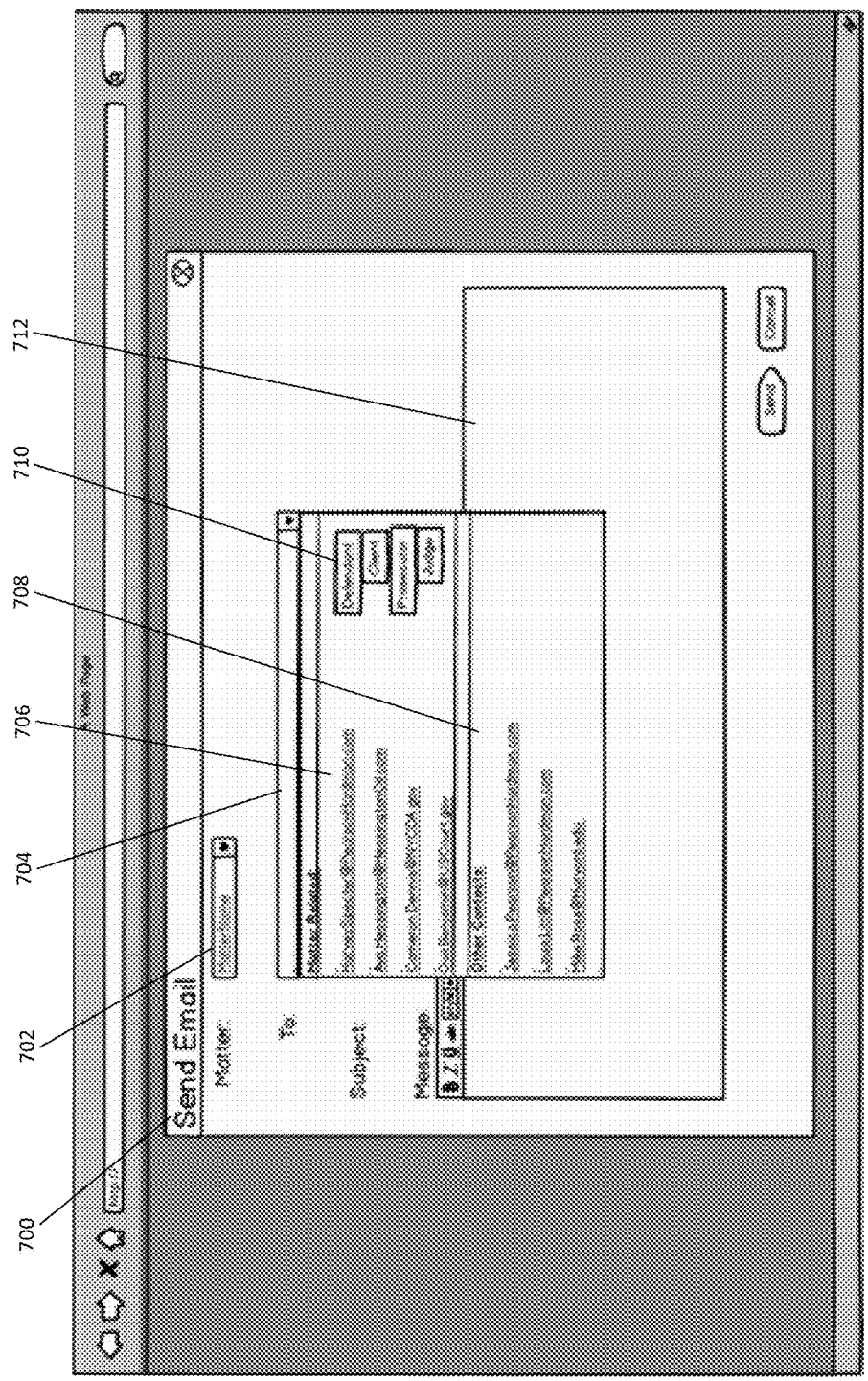
FIG. 7 is an illustration of an example user interface in accordance with an embodiment of the present disclosure.

Turning now to FIG. 5, there is shown a flowchart illustrating an example method according to the present disclosure. In a messaging system using the example configuration as shown in FIG. 3 above, display 106 of client device 100 may present the user with a message drafting interface or screen 700, as shown, for example, in FIG. 7. Message drafting interface 700 may include a project field 702 (in this example shown as "Matter"), a recipients field 704 (in this example shown as "To"), and a message body field 712. Message drafting interface 700 may also optionally include a subject field (obscured in the example). When message drafting interface 700 is presented to the user, in step 502, message drafting interface 700 enables the user to select a project.

When a project is selected, in step 504, application 312 identifies recipients related to the project by retrieving a list of contacts associated with the selected project from database 314. Application 312 then arranges the retrieved contacts based on the contacts' respective roles. Alternatively, application 312 may arrange the retrieved contacts based on the contacts' level of involvement in the project.

Based on the retrieval and arrangement of contacts, application 312, in step 506, populates a related contacts list 706, which in this example is shown as a drop-down menu below recipients field 704, to be presented to the user. Alternatively, related contacts list 706 may be presented above, adjacent to, or independent of recipients field 704. A role identifier 710 for each contact may also be included in related contacts list 706. Additional contacts not related to the selected project may also be shown to the user in another contacts list 708, which in this example is shown in the drop-down menu below related contacts list 706. Alternatively, other contacts list 708 may be presented above, adjacent to, or independent of related contacts list 706 and/or recipients field 704. In some embodiments, other contacts list 708 may include contacts not related to the selected project. In other embodiments, other contacts list 708 may include contacts that are less-closely related to the selected project than the contacts presented in related contacts list 706. One or more addresses for each contact shown in related contacts list 706 and other contacts list 708 may also be presented.

In step 508, message drafting interface 700 enables the user to select a contact to add as a recipient of the message. When the user selects a contact, application 312 adds the address of that contact to recipients field 704.

In step 510, application 312 checks whether additional contacts need to be added to recipients field 704. If it is determined that additional contacts need to be added, processing returns to step 508. If it is determined that all needed contacts have been added, processing proceeds to step 512, where message drafting interface 700 enables the user to complete the remainder of the message, such as filling out the subject field and/or message body field 712. Alternatively, the subject field may be automatically populated with a predetermined string of characters related to the selected project. For example, the project name or other information related to the project may be entered into the subject field by application 312, and may be editable by the user. When the message has been completed, message drafting interface 700 enables the user to send the message, for example, by presenting a user-selectable button, which, when selected by the user, causes the application 312 to send the message.

Figure 6:
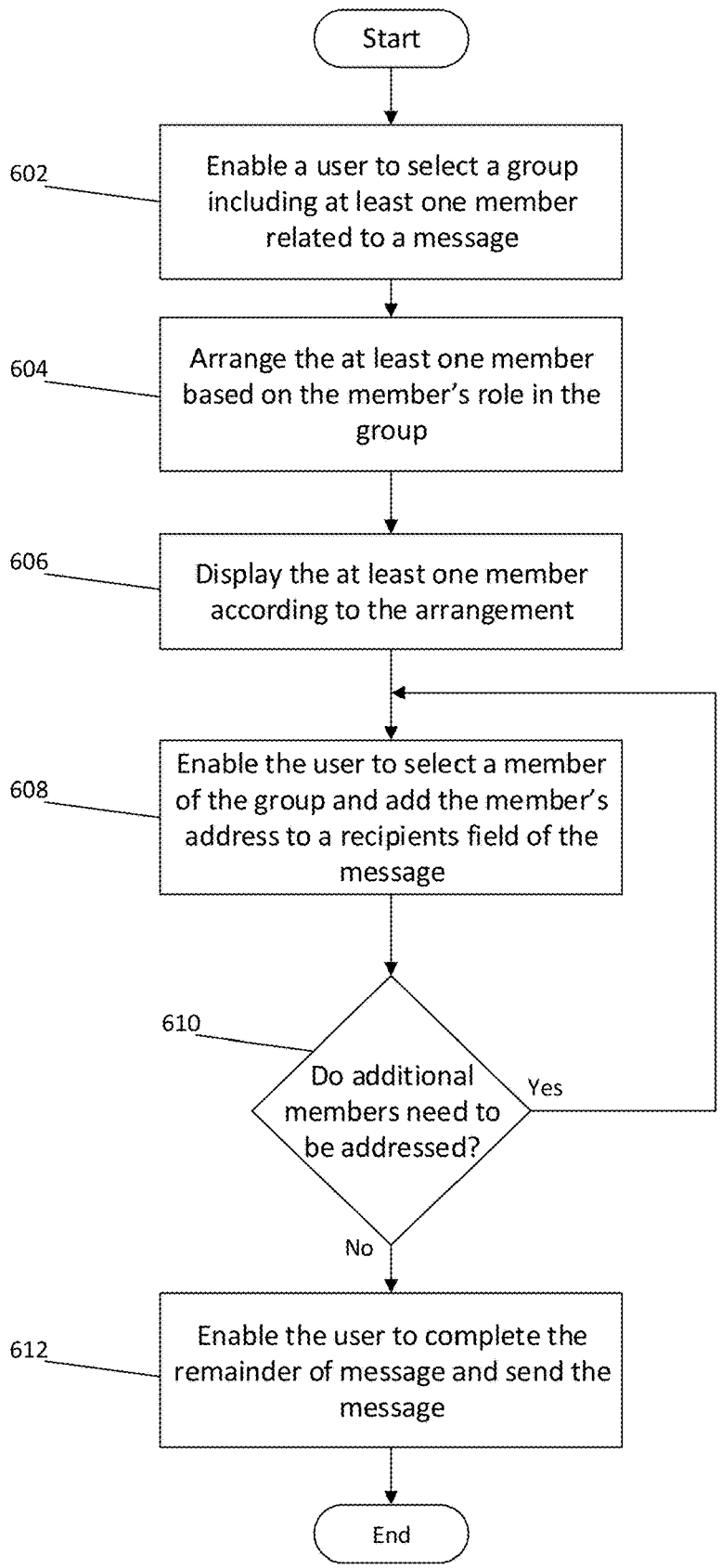
FIG. 6 is a flowchart illustrating another example method in accordance with an embodiment of the present disclosure.

Turning now to FIG. 6, there is shown a flowchart illustrating another example method according to the present disclosure. In step 602, a user is enabled to select a group related to a message, wherein the group has at least one member. In step 604, application 312 arranges the at least one member based on the member's role within the selected group. For example, a member with supervisory authority may be listed above other members of the group.

In step 606, the at least one member is displayed according to the arrangement. Thereafter, in step 608, the user is enabled to select a member of the group. When the user selects a member of the group, that member's address is added to the recipients field 704 of the message. In step 610, application 312 checks whether additional members need to be added to recipients field 704. If it is determined that additional members need to be added, processing returns to step 608. If it is determined that all needed members have been added, processing proceeds to step 612, where the user is enabled to complete the remainder of the message. When the message has been completed, the user is enabled to send the message.

While the above example embodiments are directed to a system 30 such as shown in FIG. 3, those skilled in the art will appreciate that the same or similar processes and functionality may be achieved by using system 40 such as the system shown in FIG. 4.

Figure 8:
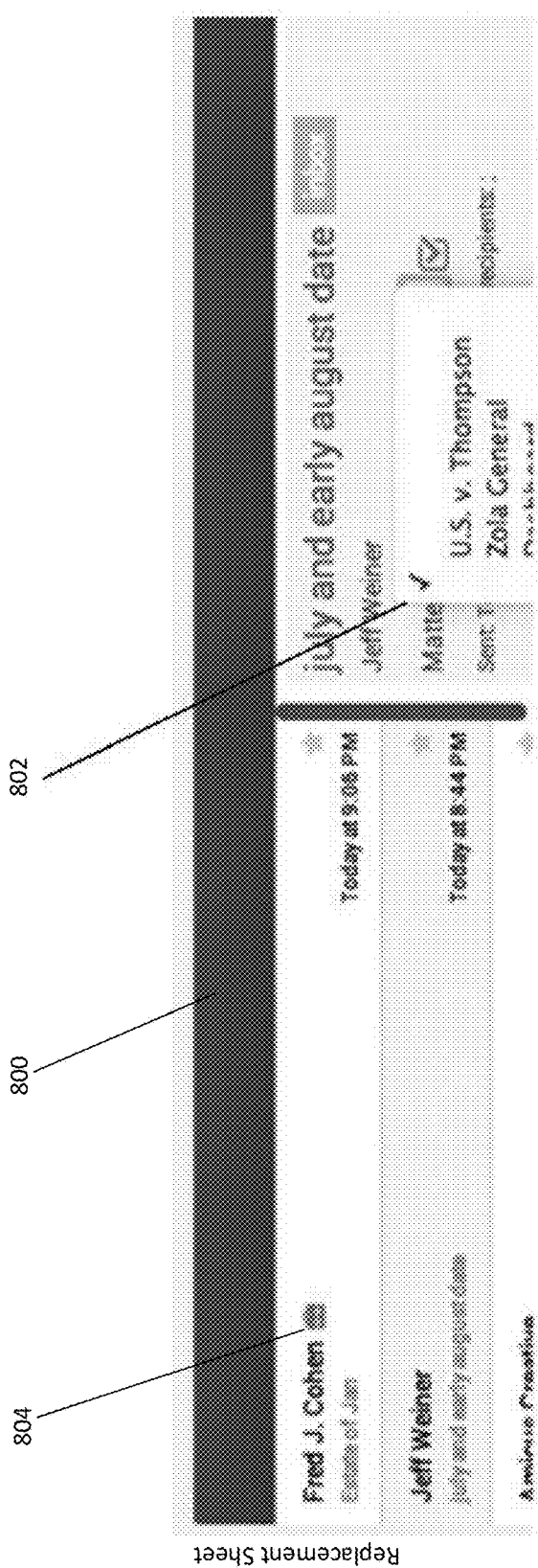
FIG. 8 is an illustration of an example user interface in accordance with another embodiment of the present disclosure.

Referring now to FIG. 8, there is shown an example user interface of application 112 and/or application 312 in accordance with an embodiment of the present disclosure. In addition to selecting a project when sending messages, a project may also be assigned to received messages. A received messages interface 800 may be presented to the user of client device 100. By selecting a received message in received messages interface 800, the user may cause a projects interface 802 to be presented enabling the user to assign a project to the received message. For example, projects interface 802 may include a list of all projects in which the user is involved. Alternatively, application 112 or application 312 may present a list of projects in projects interface 802 which are most likely to be related to the received message based on the content or other data associated with the received message. Projects interface 802 may also include a search function where the user may search for a project.

When the user assigns a project to a received message, a project indicator 804 may be presented in association with the received message. For example, project indicator 804 may be presented next to the name of the sender of the message, as shown in FIG. 8. The project indicator may be a user-selectable shape, color, and/or other design to enable the user to easily identify multiple projects. Once a project has been assigned to a received message, application 112 or application 312 may automatically assign the same project to subsequent received messages in the same message chain. In some embodiments, project indicator 804 may be automatically applied by application 112 or application 312 to a message based on information contained within the message. For example, application 112 or application 312 may be configured to read information, such as a project identifier or code, in the subject field of the message and assign a project indicator 804 based on this information.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A method for addressing message recipients in a messaging graphical user interface, the method comprising:
    displaying a messaging graphical user interface screen including a project selection field, which displays a plurality of project identifiers, a recipients field, and a message input field in which a user creates a message including text;
    receiving a user selection of a project identifier from the plurality of project identifiers in the project selection field;
    in response to receiving the user selection of the project identifier, retrieving a list of recipients including a first plurality of recipients that play roles on the identified project and a second plurality of recipients that do not play a role on the identified project;
    in response to retrieving the list of recipients displaying, in a drop-down list of the recipients field in the messaging graphical user interface screen, the first plurality of recipients and the second plurality of recipients, wherein each recipient in the drop-down list has at least one address, and wherein the first plurality of recipients are arranged in order according to the roles played by the first plurality of recipients on the project and the second plurality of recipients are displayed below the first plurality of recipients in the drop-down list of the recipients field;
    for each recipient of the first plurality of recipients listed, displaying a role identifier adjacent to the each recipient's address to indicate the each recipient's played role on the identified project;
    receiving a user selection of one or more recipients from the drop-down list of the recipients field; and
    adding the address of each selected recipient to the recipients field as the message recipients.

2. The method according to claim 1, further comprising:
selecting a group related to the message from the first and second pluralities of recipients,
wherein the selected group includes at least two members arranged based on the at least two members' respective roles within the selected group, and
wherein the at least two members have at least one address.

3. The method of claim 1, wherein the displayed first and second pluralities of recipients are arranged according to a level of involvement in the project.

4. The method of claim 1, wherein members of the first and second pluralities of recipients are based on parameters related to a level of importance of the members' involvement with the project.

5. The method of claim 1, wherein the first plurality of recipients are displayed in a separate area from the second plurality of recipients.

6. The method of claim 1, further comprising displaying the addresses associated with each recipient.

7. The method of claim 1, wherein the project is at least one of a task, matter, case, subscription list, group, lead, opportunity, or parent entity.

8. An apparatus for selecting message recipients in a messaging graphical user interface, the apparatus comprising:
a processor; and
a memory storing instructions which, when executed by the processor, cause the apparatus to:
display a messaging graphical user interface screen including a project selection field, which displays a plurality of project identifiers, a recipients field, and a message input field in which a user creates a message including text;
receive a user selection of a project identifier from the plurality of project identifiers in the project selection field;
in response to receiving the user selection of the project identifier, retrieving a list of recipients including a first plurality of recipients that play roles on the identified project and a second plurality of recipients that do not play a role on the identified project;
in response to retrieving the list of recipients, display, in a drop-down list of the recipients field in the messaging graphical user interface screen, the first plurality of recipients and the second plurality of recipients, wherein each recipient in the drop-down list has at least one address, and wherein the first plurality of recipients are arranged in order according to the roles played by the first plurality of recipients on in the project and the second plurality of recipients are displayed below the first plurality of recipients in the drop-down list of the recipients field;
for each recipient of the first plurality of recipients listed, display a role identifier adjacent to the each recipient's address to indicate the each recipient's role on the identified project;
receive a user selection of one or more recipients from the drop-down list of the recipients filed; and
add the address of each selected recipient to the recipients field as the message recipients.

9. The apparatus according to claim 8, wherein the first plurality of recipients are displayed in a separate area from the second plurality of recipients.

10. The apparatus according to claim 8, wherein the instructions further cause the apparatus to select a group related to the message from the first and second pluralities of recipients,
wherein the selected group includes at least two members arranged based on the at least two members' respective roles within the selected group, and
wherein the at least two members have at least one address.

11. The apparatus according to claim 8, wherein the displayed first and second pluralities recipients are arranged according to a level of involvement in the project.

12. The apparatus according to claim 8, wherein members of the first and second pluralities of recipients are based on parameters related to a level of the members' involvement with the project.

13. The apparatus according claim 8, wherein the instructions further cause the apparatus to display the addresses associated with each recipient.

14. The apparatus according claim 8, wherein the project is at least one of a task, matter, case, subscription, group, or parent entity.

15. A non-transitory computer-readable storage medium including instructions which, when executed by a processor, cause a computer to:
display a messaging graphical user interface screen including a project selection field, which displays a plurality of project identifiers, a recipients field, and a message input field in which a user creates a message including text;
receive a user selection of a project identifier from the plurality of project identifiers in the project selection field;
in response to receiving the user selection of the project identifier, retrieve a list of recipients including a first plurality of recipients that play roles on the identified project and a second plurality of recipients that do not play a role on the identified project;
in response to retrieving the list of recipients, display, in a drop-down list of the recipients field in the messaging graphical user interface screen, the first plurality of recipients and the second plurality of recipients, wherein each recipient in the drop-down list has at least one address, and wherein the first plurality of recipients are arranged in order according to the roles played by the first plurality of recipients on the project and the second plurality of recipients are displayed below the first plurality of recipients in the drop-down list of the recipients field;
for each recipient of the first plurality of recipients listed, display a role identifier adjacent to the each recipient's address to indicate the each recipients played role on the identified project;
receive a user selection of one or more recipients from the drop-down list of the recipients field; and
add the address of each selected recipient to the recipients field as the message recipients.

* * * * *